United States Patent [19]
Kreegar

[11] Patent Number: 5,396,590
[45] Date of Patent: Mar. 7, 1995

[54] NON-MODAL METHOD AND APPARATUS FOR MANIPULATING GRAPHICAL OBJECTS

[75] Inventor: Jeffrey W. Kreegar, Brisbane, Calif.

[73] Assignee: Apple Computer, Inc., Cupertino, Calif.

[21] Appl. No.: 946,930

[22] Filed: Sep. 17, 1992

[51] Int. Cl.6 .................... G06F 3/00; G06F 15/62
[52] U.S. Cl. .................... 395/159; 395/161; 395/136; 395/137; 345/163; 345/121
[58] Field of Search ........ 395/159, 161, 155, 136–139, 395/133; 345/121, 126, 127, 131, 163, 167

[56] References Cited

U.S. PATENT DOCUMENTS

| | | | |
|---|---|---|---|
| 4,622,641 | 11/1986 | Stephens | 395/155 X |
| 4,661,810 | 4/1987 | Himelstein et al. | 345/126 X |
| 4,745,405 | 5/1988 | Himelstein et al. | 345/126 X |
| 5,030,945 | 7/1991 | Yeomans | 395/155 X |
| 5,299,307 | 3/1994 | Young | 395/161 |

OTHER PUBLICATIONS

Microsoft Windows User's Guide, Version 3.0, Microsoft Corporation, 1990, Chapter 8 Paintbrush, pp. 296–303.
MacDraw Pro User's Guide, Claris Corporation, 1991, pp. (3-5)–(3-21), (3-47)–(3-52).
"MacDraw makes professional debut" (Claris MacDraw Pro product announcement), MacWeek, Jul. 16, 1991, p. 30.

*Primary Examiner*—Raymond J. Bayerl
*Attorney, Agent, or Firm*—Blakely, Sokoloff, Taylor & Zafman

[57] ABSTRACT

A computer controlled graphics display system that treats graphical objects in a uniform fashion for consistent, non-modal and direct manipulation of graphics objects. The user, by operating in a visual "point and click" fashion, may select a graphical object or shape and manipulate it in a number of ways without having to activate different modes for different manipulations. Possible manipulations include dragging, scaling, rotating and skewing. More than one shape can be selected and manipulated by compositing intersected shapes with a selection rectangle. The graphic manipulations are platform independent and thus are all carried out by directing the point and click tool.

21 Claims, 10 Drawing Sheets

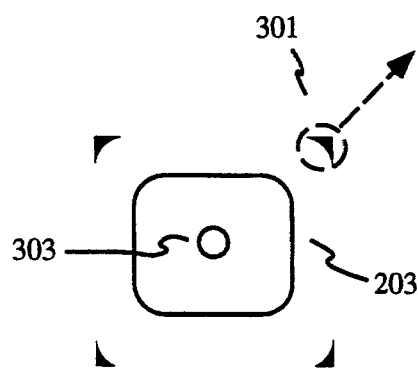
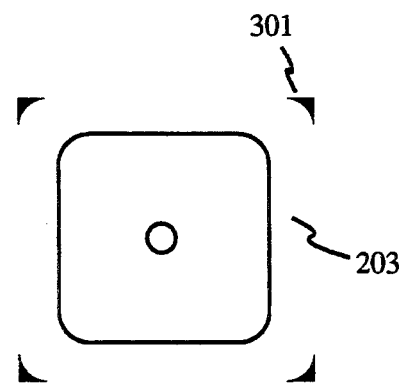
*Fig. 4(a)*       *Fig. 4(b)*
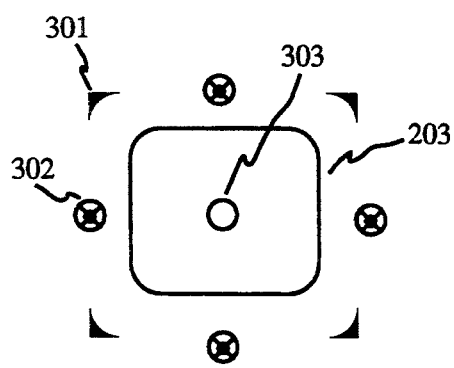
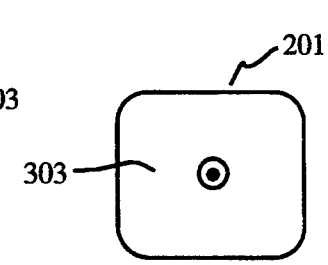
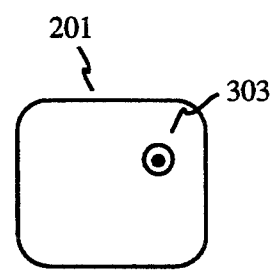
*Fig. 5(a)*     *Fig. 5(b)*     *Fig. 5(c)*
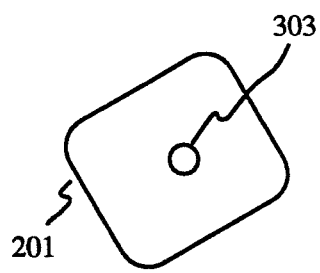
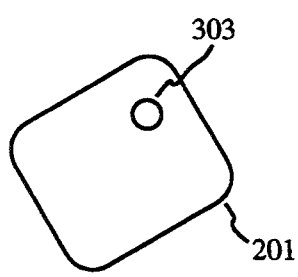
*Fig. 5(d)*     *Fig. 5(e)*

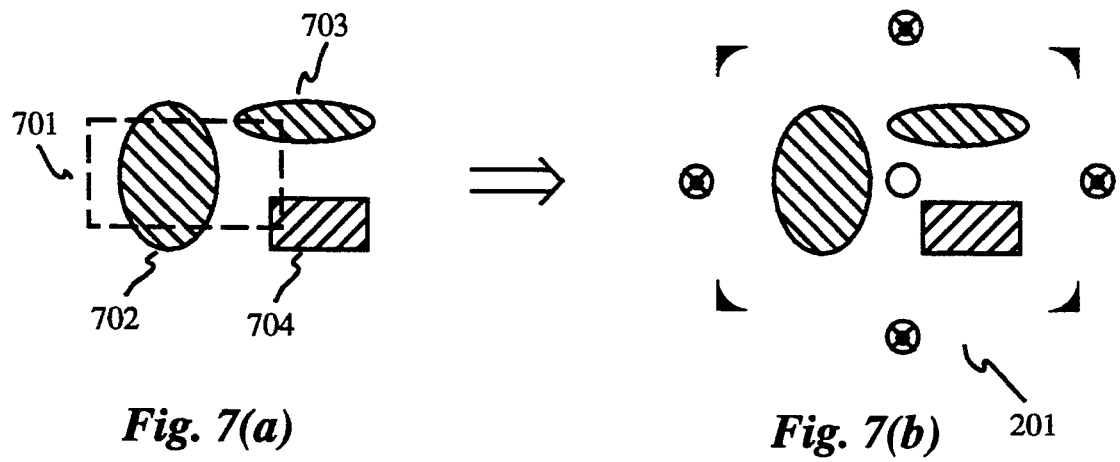
*Fig. 7(a)*  *Fig. 7(b)*
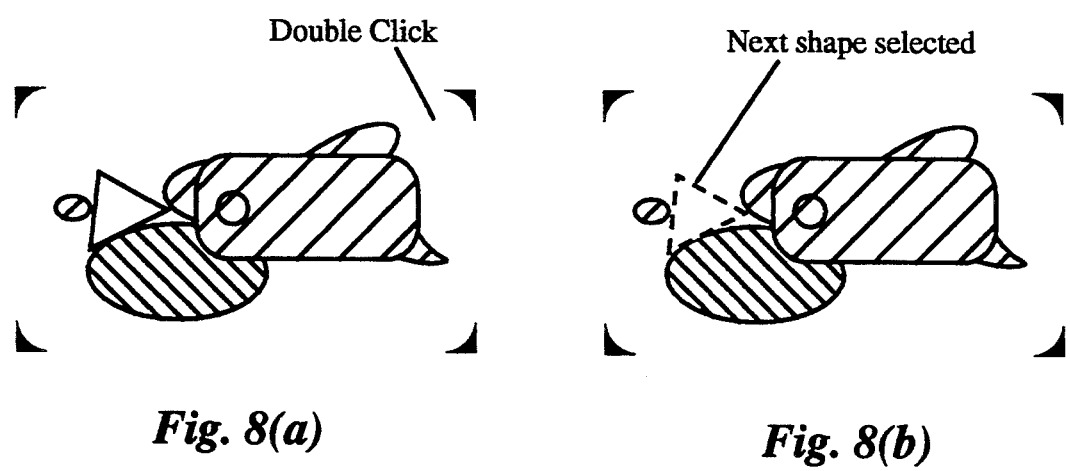
*Fig. 8(a)*  *Fig. 8(b)*

NON-MODAL METHOD AND APPARATUS FOR MANIPULATING GRAPHICAL OBJECTS

BACKGROUND OF THE INVENTION

1. Field of the Invention

The present invention relates to the field of user interfaces for computer systems. More particularly, the present invention relates to an improved user interface for handling and manipulating graphical objects in a graphical display computer environment.

2. Description of Related Art

A user interface is the means by which a user interacts with a computer system. Known user interfaces utilize windows and icons in conjunction with a cursor control device. The cursor control device, commonly a mouse or trackball device is used to position a cursor on a display. Other known cursor control devices are stylus pen-type pointers and voice command controlled cursor systems.

Cursor control devices, particularly mouse or trackball devices typically include a switch having at least two positions for generating signals to the computer to indicate a selection or other action by a user. The combination of windows, icons and a cursor control device allows a user to operate in a visual "point and click fashion" rather than through the typing of terse computer commands. "Point and click" operation refers to positioning a cursor on a display so it is over a desired image, setting a switch (usually a button) on the cursor control device into a second position (usually by depressing the button) and immediately resetting the switch to the first position (usually by releasing the button). The click generally refers to tactile and audible feedback to the user on depressing and releasing the button. An example of such a user interface is the Finder ™ interface of the Macintosh ® family of computers available from Apple ® Computer, Inc. of Cupertino, Calif. The Finder interface as implemented allows a user to locate, manage and organize data files and applications on the Macintosh Computer System. Portions of this point and click interface, as well as a mouse, have been described in U.S. Pat. No. 4,464,652.

The Finder interface is the interface for doing operating system level routines, such as opening files and folders, launching applications and etc. User interfaces are also required in executing application programs. To greatly increase the ease of use of computer systems, it is important to provide consistency in the user interfaces as seen when executing different applications. The use of consistent user interfaces has not always been easily accomplished because the system level software has not always provided the mechanisms which could be universally implemented by various applications.

Previous releases of the operating system for the Macintosh have utilized a graphics engine referred to as QuickDraw and later 32-Bit QuickDraw. Other computer operating systems use other underlying graphic subsystems. For the most part, these graphic systems have left it to developers to create mechanisms for manipulating graphics objects. The result has been an inconsistent graphics manipulation model. While some consistent mechanisms have been adhered to, inconsistencies remain depending on the type of graphics object to be manipulated. That is, a bit map may be treated differently from a filled polygon, for example. Likewise, different applications will utilize different command structures and control as their interface mechanisms.

Another disadvantage of existing graphical user interface implementations is that it is often required that the user resort to command selections independently from pointing to and operating on the desired graphics object. This is done to put the application into the appropriate mode for the desired operation, referred to as modal operation. This might be done by selecting a mode command from a menu bar selection category or selecting a mode tool from a tool palette. Future generations of graphics based computers, particularly handheld models, may forego keyboards and mode dependent interface command operations altogether. Thus, existing graphic manipulation mechanisms would prove to be altogether inadequate.

Recently, a new graphics/geometry engine has been developed whose initial applications will find use in Macintosh computers. This new system, QuickDraw GX, provides an object oriented graphic system where all graphics objects are considered equivalent objects for manipulation purposes. The QuickDraw GX system is described in U.S. Pat. No. 5,307/451 and where necessary is incorporated herein by reference. In QuickDraw GX, all graphics objects are treated generically as geometries, and when encapsulated for display purposes, referred to as shapes. Thus, to skew a bit map requires calling the same routines as skewing a filled polygon. The interface need only supply the graphics engine with the shape's identity and the desired manipulation.

With QuickDraw GX and other emerging graphic systems, it is desirable, and now possible, and therefore an object of the present invention, to provide a user interface method and apparatus for manipulating graphics objects in a consistent and non-modal way, regardless of the object-type or application running.

SUMMARY OF THE INVENTION

A method and apparatus for a computer controlled graphics display system which provides for consistent, non-modal and direct manipulation of graphics objects are disclosed. In a computer system that treats graphical objects in a uniform fashion for manipulation purposes and allows a user to operate in a visual "point and click" fashion, the present invention allows a user to select a graphics object or shape and manipulate it in a number of ways without having to activate different modes for different manipulations. That is, it is unnecessary to resort to menu bar selections to select a desired operating mode. Possible manipulations include but are not limited to, dragging, scaling, rotating and skewing. More than one shape can be selected and manipulated by compositing intersected shapes within a selection rectangle. The present invention is platform independent, so all graphics manipulations are carried out by directing the point and click tool.

The present invention detects when a shape has been selected by means of the pointing tool. Once selected, a shape is illustrated with bounding shape control tools. It is by pointing, clicking and dragging with respect to these various shape control tools that non-modal manipulations are carried out. The present invention detects when a shape control tool is activated and manipulated and provides the information to the underlying graphics system to perform the desired manipulation.

BRIEF DESCRIPTION OF THE FIGURES

The present invention will be described with respect to the following figures in which:

FIGS. 4(a)-4(b) illustrate the present invention being utilized for scaling a selected shape.

FIGS. 5(a)-5(e) illustrate the present invention being utilized for rotating a selected shape, first about the default center point, then about an arbitrarily chosen pivot point.

FIGS. 7(a)-7(b) illustrate the present invention being utilized for selecting more than one graphics object.

FIGS. 8(a)-8(b) illustrate the present invention being used for processing overlapping and hidden graphics objects.

DETAILED DESCRIPTION OF THE INVENTION

A method and apparatus for manipulating graphical objects on a computer system display are described. In the following description, numerous specific details are set forth such as pixel widths and graphics object types in order to provide a thorough understanding of the present invention. It will be obvious, however, to one skilled in the art that the present invention may be practiced without the specific details. In other instances, well-known control structures and coding techniques have not been shown in detail in order not to obscure unnecessarily the present invention.

Overview of the Computer System of the Present Invention

Figure 1:
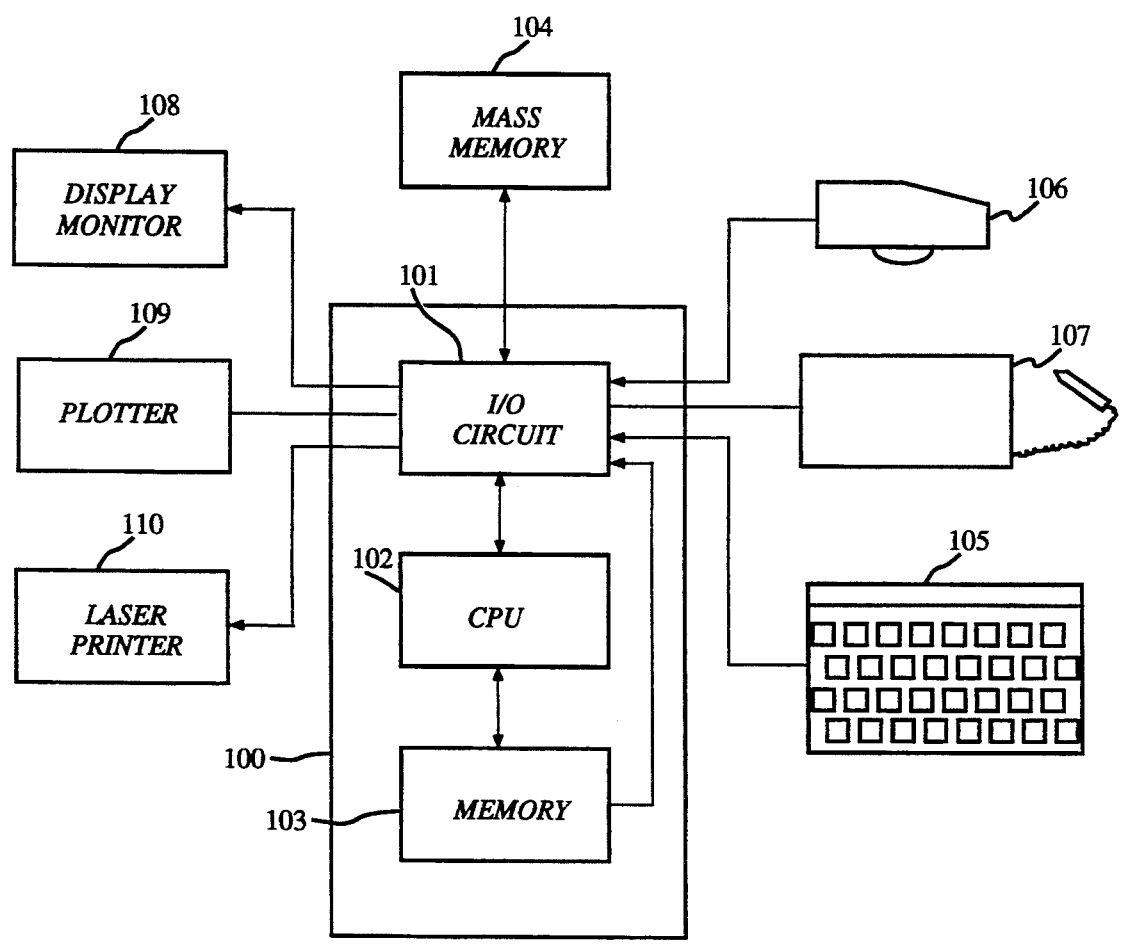
FIG. 1 illustrates a computer system as may be utilized with the present invention.

Referring first to FIG. 1, a typical computer-based system for generating computer graphic images according to the present invention is illustrated. As shown, there is a computer 100 which comprises three major components. The first of these is the input/output (I/O) circuit 101 which is used to communicate information in appropriately structured form to and from the other parts of the computer 100. Also shown as part of the computer 100 is the central processing unit (CPU) 102 and memory 103. These two latter elements are those typically found in most general purpose computers and almost all special purpose computers. In fact, the several elements contained within computer 100 are intended to be representative of this broad category of data processors. Particular examples of suitable data processors to fill the role of computer 100 include machines manufactured by Apple Computer Co., Cupertino, Calif. Other computers having like capabilities may of course be adapted in a straightforward manner to perform the several functions described below.

Also shown in FIG. 1 is an input device 105, shown in a typical embodiment as a keyboard. There is also shown as an input device a graphics tablet 107. It should be understood, however, that the input device may actually be any other well-known input device (including, of course, another computer). A mass memory device 104 is coupled to I/O circuit 101 and provides additional storage capabilities for the computer 100. The mass memory may include other programs, fonts for different characters and the like and may take the form of magnetic or optical disk drive or any other well-known device. It will be appreciated that the data retained within mass memory 104, may, in appropriate cases, be incorporated in standard fashion into computer 100 as part of memory 103.

In addition, three (3) typical computer display devices are illustrated, the display monitor 108, the plotter 109, and a laser printer 110. Each can be used to display images generated by the present, though each has or may have different resolutions. A cursor control device 106, such as a mouse, trackball or stylus is shown coupled to I/O circuit 101. It should be noted that the cursor control device of the preferred embodiment will include at least one switch capable of being detected in at least two positions.

The preferred embodiment of the present invention is to be implemented in the graphics interface on a Macintosh computer available from Apple Computer, Inc. of Cupertino, Calif.

Operation of the Present Invention

Graphics applications that run on computer systems ideally utilize the system's underlying graphics engine to promote consistency from one application to another. Typically, graphics applications will provide the user with a window (also called a visible display area) in which to manipulate a graphics image. The graphics applications may be stand-alone graphics programs or incorporated into other applications, such as word processors and desk top publishing programs.

Graphical images supported by graphics applications may be comprised of a plurality of different graphic-type objects. In advanced graphical subsystems, particularly in QuickDraw GX, all graphical images are maintained as a set of base geometries to which all geometric operations are applied. The encapsulation of the geometry is referred to as a shape and shapes may be aggregated into objects called pictures. The underlying geometry may be any number of types, including but not limited to points, lines, rectangles, curves, polygons, paths and bit maps. Even text in the graphical environment may be considered a geometry. The underlying geometry engine is the only portion of the system that should need to be concerned with the particular geometry type.

Because a shape is an encapsulated geometry, geometric operations work on shapes regardless of the shape-type, shape fill or shape content. Thus, a user interface for manipulating graphically displayed objects need only consider a single manipulable object, the shape. The geometry engine then processes the manipulation requested on the underlying geometry.

Where a shape is an encapsulated geometry, a collection of shapes is referred to as a picture. Pictures can impose a hierarchy on shapes, override characteristics of constituent shapes, include other pictures or reference a given shape one or more times. However, despite the level of complexity that may be embodied in a given picture, at its lowest level, a picture is a hierarchy of geometries, and therefore, the basic geometrical operations are applicable to pictures as readily as to shapes. Most of the following discussion will be directed toward shapes, however, the operations described should be understood to apply equally to pictures.

The user interface to be described herein is intended to be utilized in conjunction with an underlying graphics engine which is capable of performing requested geometrical operations to identified shapes. The term "shape" used herein is meant to refer to whatever encapsulated geometry is recognized by the underlying graphics engine. References to QuickDraw GX are purely for illustrative purposes as the present invention will find wide application as a user interface in other graphics environments. Further, descriptions of pointing and selecting will be referred to as mouse operations throughout. Of course, devices like the ones described above are equally usable.

Figure 2:
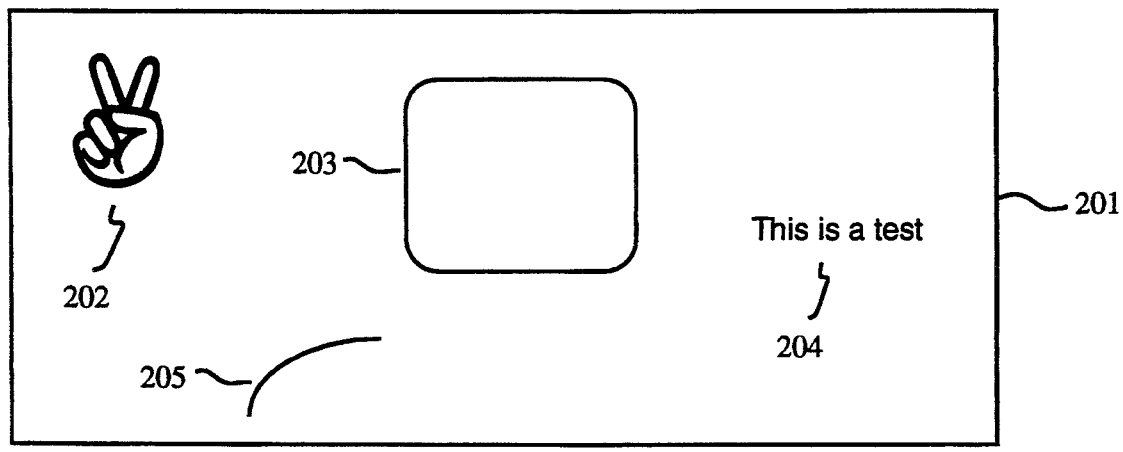
FIG. 2 illustrates a graphic computer display showing a number of graphical objects.

Referring now to FIG. 2, a computer display 201 is shown with several graphics objects illustrated thereon. The illustrated objects represent different shape-types. For instance, the object 202 is a bit map, 203 a filled polygon, 204 text and 205 a curve. While the underlying data structures for these objects are quite different from each other, the distinctions are handled by the underlying graphic system. For the purposes of a user interface, each object is referred to by its shape identifier with a desired request to be executed for that shape, the processing of which is handled by the graphics subsystem. For example, to move a shape one would select a shape by pointing to it and depressing the button on the mouse and holding it down. Then, while the button is held down, the mouse is dragged to a new location, moving the shape to that new location. In the preferred embodiment of the present invention, the shape itself is actually moved rather than a region in a bounding rectangle. This is facilitated by the shape data structure maintained by the underlying graphics system. While in conventional graphics systems it might have been necessary to first pick the pointing tool from a tool palette, the user interface of the present invention does not require it. Depressing the mouse button while pointing to an object and then dragging the mouse initiates a move without having to select any special move tool from a tool palette.

Figure 3:
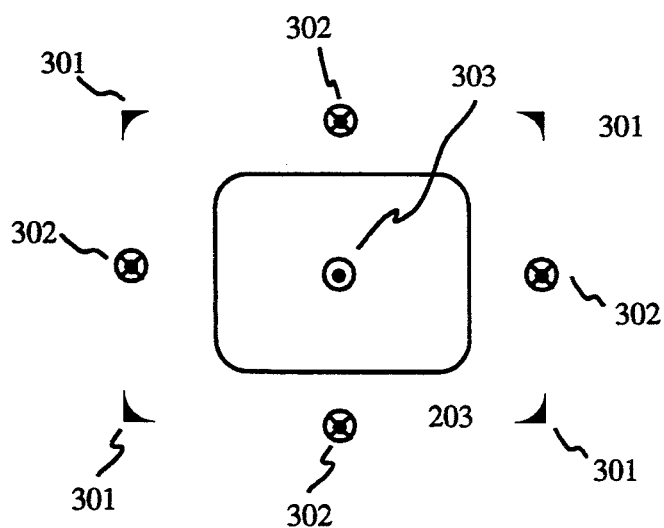
FIG. 3 illustrates a single selected graphical object with the shape control tools of the present invention illustrated.

As with moving a graphical object, the present invention provides for performing other manipulations without having to select a special tool from a menu or tool palette. An object is selected by pointing to a shape and clicking once (depressing and releasing the mouse button). When an object is selected, the user interface of the present invention displays the shape control tools in the proximity of the selected shape. FIG. 3 provides an illustration of the filled polygon shape 203 showing the associated shape control tools. The scaling shape control tools 301 are illustrated as pointers and are placed at diagonally opposed positions around the selected shape. The skew control tools 302 are likewise illustrated in opposing positions around the selected object. Initially in the center of the object is placed the movable rotate control 303. Each of the displayed shape control tools is itself displayed as a graphical object and their placement is controlled by the underlying graphics subsystem at the direction of the user interface of the present invention.

In order to perform the functions of scaling, skewing or rotating, the desired tool is selected using the mouse by pointing to and holding the selector button down over the desired tool and then moving the mouse in the manner desired to perform the manipulation of the graphics object. Thus, no resort is made to a separate tool palette or to menu bar command selections. The operations may be performed simply by selecting the object and then selecting and utilizing one of the displayed shape control tools, each of which will be described in more detail further herein.

FIG. 4(a) illustrates the selected shape 203 being subjected to scaling by manipulating the scale control tool 301 in the upper right-hand corner of the selected shape. To scale a selected shape, it is necessary to place the cursor over the scale control tool that is closest to the direction of desired scaling and depress the mouse button. The scale control tool is then dragged in the direction of desired scaling. To undo scaling, an "undo" command can be executed. Such "undo" commands are provided by most graphics and computer systems which maintain a memory as to previously executed operations and are capable of restoring the system to a position just prior to that operation. Note that upon selection of a scaling tool, the other shape control tools become invisible. This is done to keep the shape that is being scaled in focus. The centrally located rotate control is illustrated as unselected by having the highlighted dot removed from its center. FIG. 4(b) illustrates the selected filled polygon 203 after it has been scaled in the direction of the upper right scale control tool. The default scale direction is from the opposite corner of the selected scale control. Scaling a shape has the behavior of stretching the shape from its opposite side. After scaling, the shape control tools are then redisplayed around the scaled shape.

Rotating a selected shape is illustrated in FIGS. 5(a)–5(e). FIG. 5(a) shows selected shape 203 with all of its shape controls displayed. To rotate the shape, the rotate shape control 303 is selected and then the mouse is moved around the rotate control. As when scaling, the other shape controls become invisible when the rotate control 303 has been selected to help focus the operation. FIG. 5(b) illustrates the selected shape 203 where the rotate control has been selected. The dot in the center is highlighted to indicate selection. Motion of the mouse around the rotate control institutes rotation of the shape. The closer to the rotate control the mouse is, the faster the shape will rotate; the farther away from the rotate control the mouse is, the slower the rotation. FIG. 5(c) illustrates the selected shape of FIG. 5(b) after it has been rotated about a center rotation point. The rotate control defaults to rotation around the center of the shape. However, it can be moved anywhere in the visible display area of the display device. The movable rotate control 303 provides for rotation of objects around arbitrary points. To move the rotate control from the shape's default center, the mouse should be placed on or near the center of the rotate control, thereby highlighting the rotate control center. Then, to move the rotate control to a new, arbitrary, rotation point, using the mouse, select down on the control and drag it to the desired rotational center. Rotation then will be about this new arbitrary center point as described above. FIG. 5(d) illustrates the selected shape 201 having the movable rotate control dislocated from its center location. FIG. 5(e) shows the selected shape 201 having been rotated around the moved rotate control.

Figure 6A:
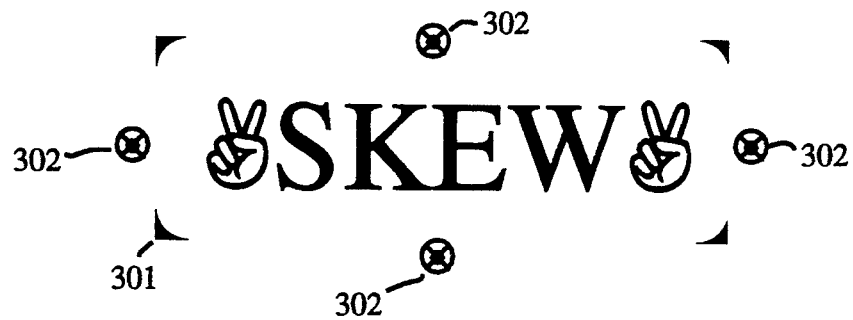
FIGS. 6(a)-6(c) illustrate the present invention being utilized for skewing a graphics object.
Figure 6B:
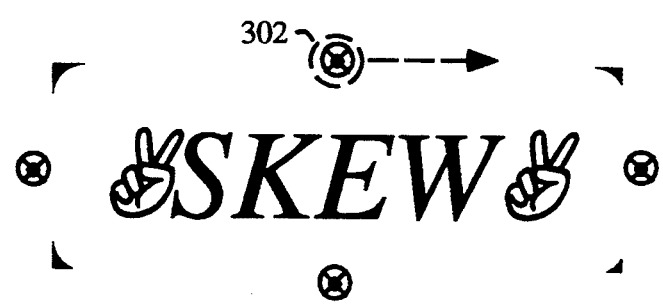
Figure 6C:

FIG. 6(a) illustrates a selected shape with its shape controls highlighted. Skewing is accomplished by selecting the skew control that is closest to the desired direction of skewing once the shape has been selected. To perform skewing, a skew control should be selected and then dragged. As with other shape manipulations, to move back to an original position, an "undo" command may be executed. Also like other shape controls, when a skew tool 302 is selected, the other shape controls become invisible to help focus the operation. The default is to skew from the opposite side of a selected skew control. FIG. 6(b) shows the figure of the shape of FIG. 6(a) undergoing skewing when the top skew control tool 302 has been selected and offset to the right. FIG. 6(c) illustrates that skewing a shape may encompass 180° and even 360° skewing.

Throughout the description of the user interface of the present invention, the user has been instructed to select a single shape by pointing to it and clicking the mouse button. It is also possible to select more than one shape using a device known as a selection rectangle. When the mouse is pointing to an area on the display that is not a shape, and the button is depressed, the default result is the generation of a selection rectangle. The selection rectangle is illustrated as perforated box 701 of FIG. 7(a). The size of the rectangle is controlled by directing the mouse away from the point initially selected. When the button is released, all shapes intersected by the selection rectangle are composited to a new shape and that shape is then selected. Thus, in FIG. 7(a), the shapes 702, 703 and 704 are intersected by the selection rectangle 701 and are selected as the shape 201 in composite with the display control tools illustrated thereon, shown by FIG. 7(b). Intersection with a shape is determined by whether or not a shape edge has been crossed or surrounded. The edge of a shape is defined as all points within a predetermined number of pixels from the edge of the maintained shape geometry.

Another problem that is frequently encountered that must be dealt with is the case of overlapping and hidden shapes. The user interface of the present invention is capable of dealing with the situation. The collection of overlapping shapes is selected in one of the manners described above. Thereafter, to walk through the list of enclosed shapes, the user points to and double clicks inside the currently selected shape collection. Each shape in the list of contained shapes is then subsequently selected but leaving them in a relative position, with the bounding shape controls then used to manipulate the particularly selected shape. FIGS. 8(a) and 8(b) show a composite collection of overlapping shapes in which subsequent ones are selected by double clicking on the enclosed area.

Referring now to FIGS. 9-15, the method for the user interface of the present invention will be described in more detail. FIGS. 9(a) and 9(b) illustrate the overall method of the user interface in accordance with one embodiment of the present invention. The shape controls user interface 900 is an interrupt driven procedure which monitors for user commands initiated through the mouse and mouse button in a nonmodal way. At step 901 the interface monitors for a selection activity from the mouse. In the present invention, such activity is initiated by pointing to an area on the screen and depressing the mouse button. Decision box 902 determines whether or not a selection rectangle is being initiated rather than selecting a single object. A selection rectangle is the default when mousing outside of a shape. That is, the selection rectangle is always engaged when the mouse button is down on any "white area" of the display. If it is determined that a selection rectangle is being engaged than at step 903 the selection rectangle is created and resized once the user deactivates the mouse button thereby determining the bounds of the selection rectangle. At step 904 all the shapes that are intersected or enclosed by the selection rectangle are selected.

If no selection rectangle is initiated at step 902, or following the termination of the selection rectangle then at step 905 it is determined whether or not a shape has actually been selected. If not, the procedure returns to step 901 to monitor for selection activity.

Once it has been decided that a shape or collection of shapes have been selected, at decision box 906 it is determined whether or not the shape is being moved or dragged. To drag a shape, the mouse is used to select down on the shape and drag it to a new destination, then release the button. If the shape is being moved, then at step 907 the procedure Move Selection is initiated. This procedure will be described in more detail further herein with respect to FIG. 10. After the Move Selection procedure is executed the operation returns to the main routine at decision box 905. If the shape is not being moved then at step 908 the shape control tools are displayed. Each of the shape control tools is itself a graphical object that is maintained and rendered by the underlying graphics subsystem. The procedure for displaying shape control tools is described in more detail further herein with respect to FIG. 15.

Once a selection has been made and the shape control tools have been displayed, the procedure goes into a routine at step 909 that monitors for the selection of one of the displayed shape control tools. Decision box 910 tests for whether or not a shape control tool has been selected and, if not, then at decision box 911 the procedure tests to see whether or not the shape has been deselected. If the shape has been deselected then the routine returns to the main routine at step 901 to monitor for the selection of a shape or shapes. If the shape has not been deselected and no shape control tool has been selected then the routine returns to monitoring step 909 to monitor for the selection of a shape control tool.

Figure 9A:
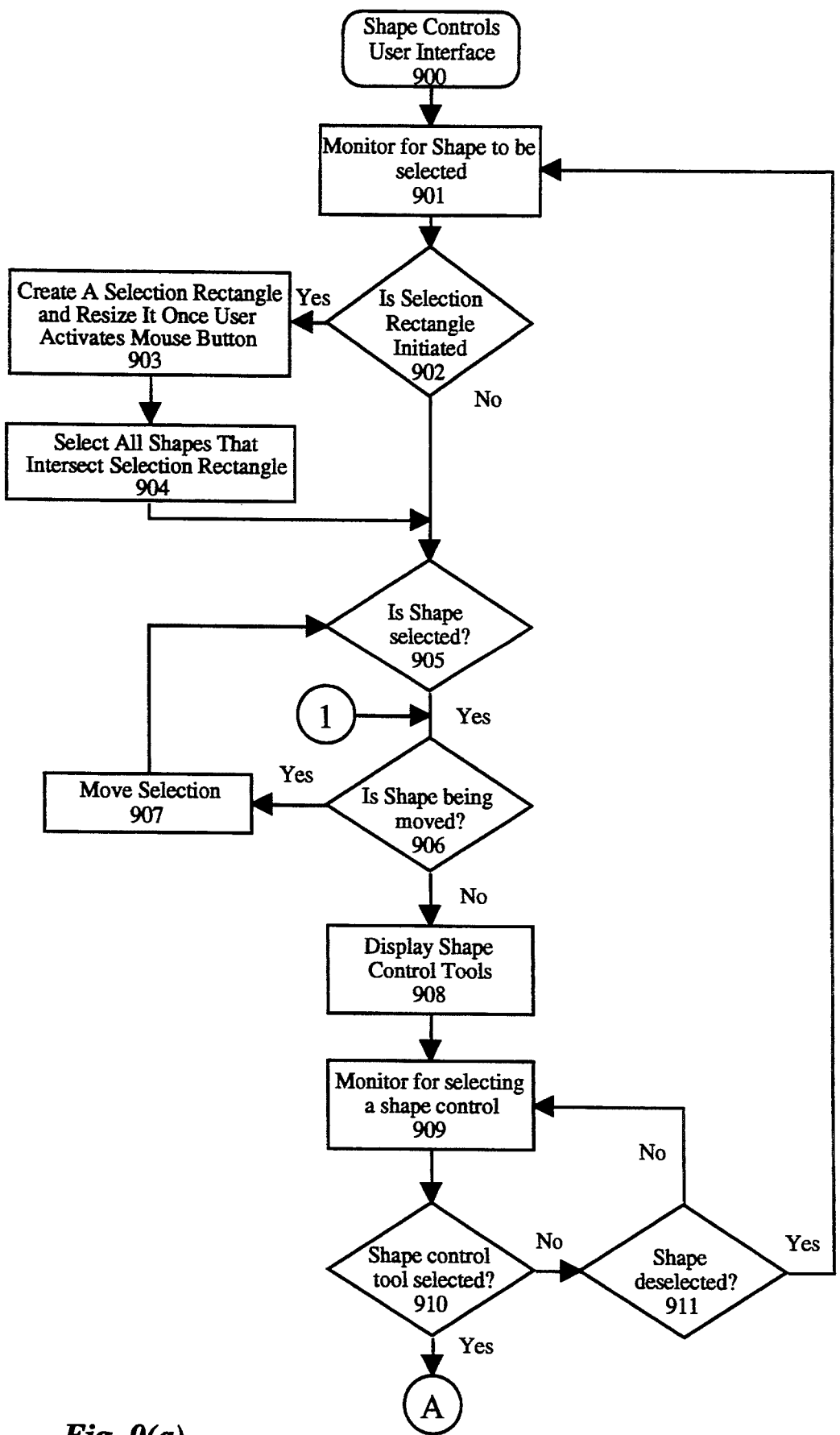
FIGS. 9(a)-9(b) illustrate the flow chart for the overall process of the user interface in accordance with the present invention.
Figure 9B:
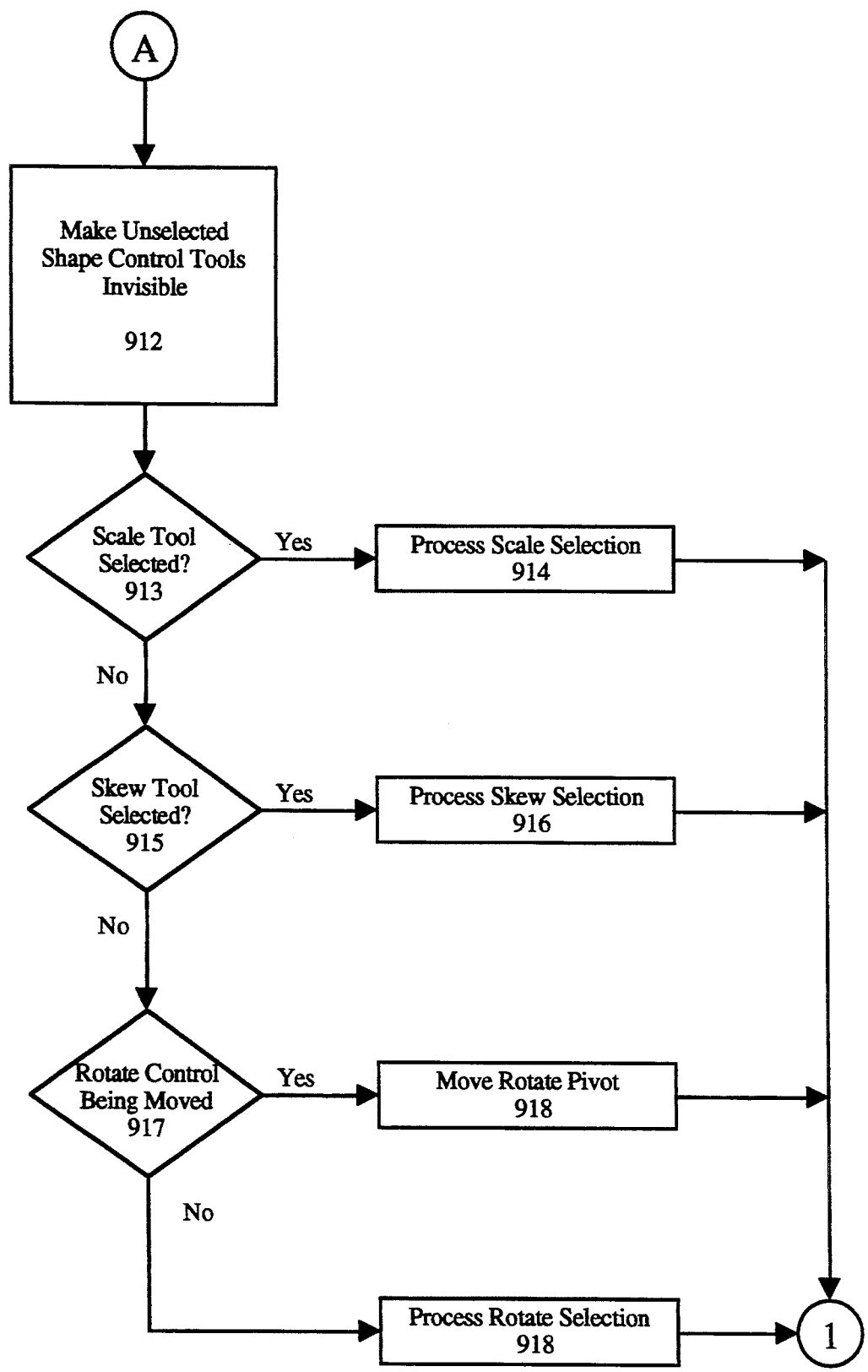

Once a shape control tool has been selected the procedure moves to the remaining steps of the procedure 900 illustrated in FIG. 9(b). At step 912 the unselected shape control tools are made invisible. As described above, this provides for focusing on the operation to be carried out by the selected shape control tool. If at decision box 913 it is determined that the scale shape control tool is selected then at box 914 the procedure Scale Selection is initiated. This procedure is illustrated in more detail with respect to the flow chart shown in FIG. 11. If at decision box 915 it is determined that the skew tool is selected then the routine Skew Selection is initiated at step 916. The routine Skew Selection is described in more detail with respect to FIG. 12. If at decision box 917 it is determined that the rotate control is being moved then at step 918 the routine Move Rotate Pivot is engaged. The routine Move Rotate Pivot is described in more detail with respect to the flow chart shown on FIG. 13. Finally, if the shape is being rotated by having selected the rotate control then the process Rotate Selection is initiated at step 919. Once the object manipulation has been carried out the routine returns to the position indicated on FIG. 9(a) where the fist test for what is happening with the selection is carried out.

Figures 10, 11:
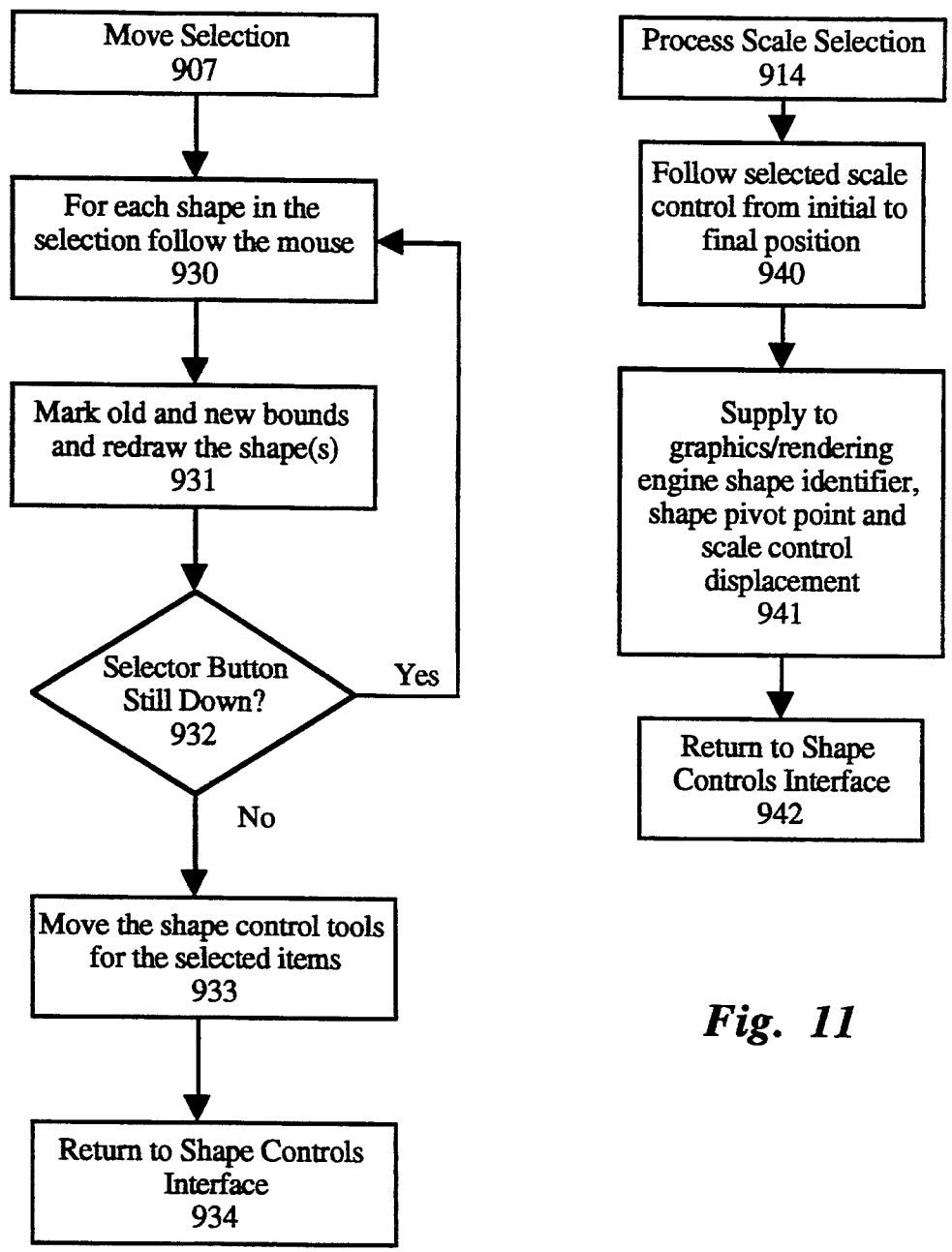
FIG. 10 is a more detailed flow chart illustrating the process steps for moving a selected graphics object.
FIG. 11 is a more detailed flow chart illustrating the method of scaling a graphics object.

FIG. 10 illustrates the routine Move Selection 907. At step 930, for each shape in the selected area or for the selected shape, the mouse is followed while the selector button is down. At step 931 the old and new bounds for the selection are marked and the shape is redrawn at the current location indicated by the mouse. At decision box 932 if it is determined that the selector button is still down then the procedure returns to step 930 to follow the mouse's motion. Once the selector button has been released at step 933 the shape control tools for the selected item are moved. As described, the shape control tools are displayed by the graphical subsystem in the same way any shape or graphical object is displayed. At step 935 the routine returns to the shape controls interface.

FIG. 11 illustrates the routine Scale Selection 914 for scaling a selected object when the user interface indicates that a scale selection tool is being manipulated. At step 940 the selected scale control tool is followed as indicated by the motion of the mouse in moving the tool. At step 941 the graphics and rendering engine for the underlying system are supplied with the shape's identifier, the shape pivot point and the displacement of the selected scaling control. With this information the graphic system is then able to apply its procedures for scaling the selected graphics object. Then at step 942 the procedure returns to the user interface of the present invention in FIG. 9.

Figure 12:
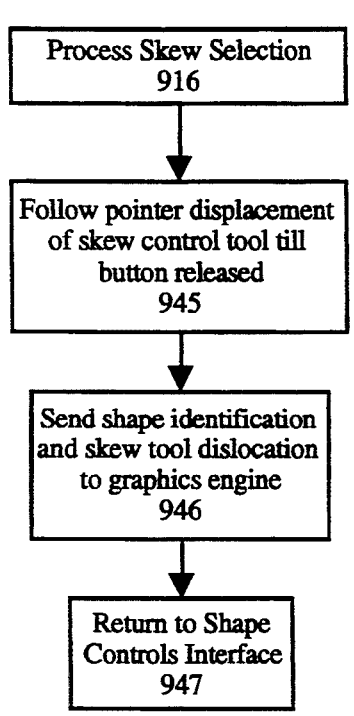
FIG. 12 is a more detailed flow chart illustrating the method steps for skewing a graphics object.

FIG. 12 illustrates the routine Skew Selection 916. At the user interface level, skewing is accomplished in much the same way as scaling. At step 945 the pointer is followed to measure the displacement of the selected skew control tool until the button is released. The shape identification, skew tool and displacement, pivot point and other information regarding the shape are then supplied to the graphics and rendering engine at step 946 which then provides for skewing the shape. The routine then returns to the shape controls interface at step 947.

Figure 13:
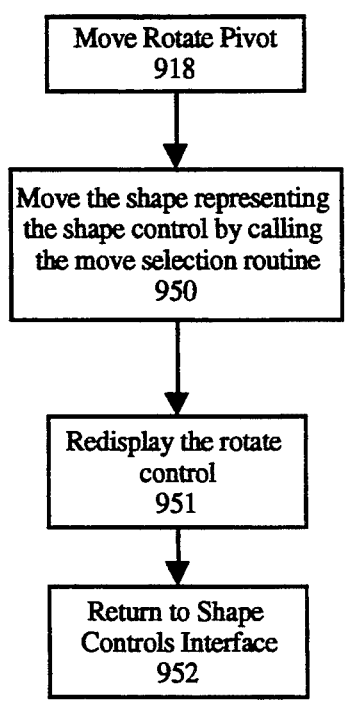
FIG. 13 is a more detailed flow chart illustrating steps of moving a shape control tool for rotation.

FIG. 13 shows a flow chart for the routine 918 for moving the rotate pivot from its current location which by default is the center of selection. At step 950 the mouse is followed to determine where the rotate control is being moved. Moving the rotate control is similar to moving any graphical object and the moving routine is similar to that described with respect to the Move Selection routine 907. Once the shape for the rotate control has been moved, at step 951 the rotate control is redisplayed so that the system knows where the rotate control is. The routine then returns to the main user interface at step 952.

Figure 14:
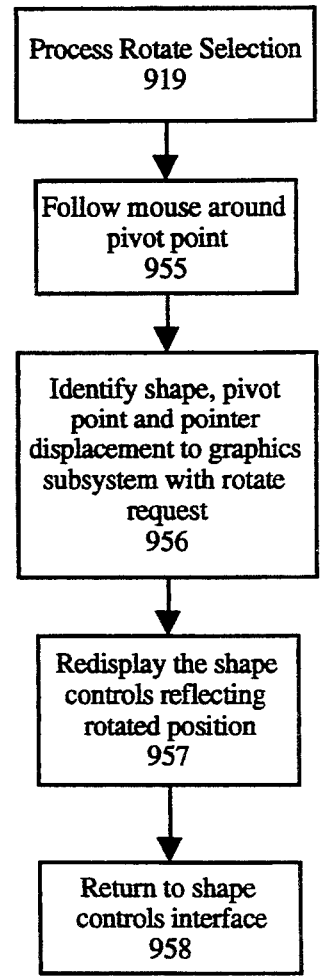
FIG. 14 illustrates a more detailed flow chart for rotating a graphics object.

FIG. 14 illustrates the routine for rotating a selection when the rotate control has been selected. At step 955 the mouse is followed around the rotate pivot point. Step 956 provides information to the graphics/rendering engine identifying the shape, pivot point and amount of displacement around the rotate control so that the graphics system can then rotate the selection. At step 957 the shape controls are redisplayed reflecting the rotated orientation of the selection. The routine then returns to the shape controls user interface at step 958.

Figure 15:
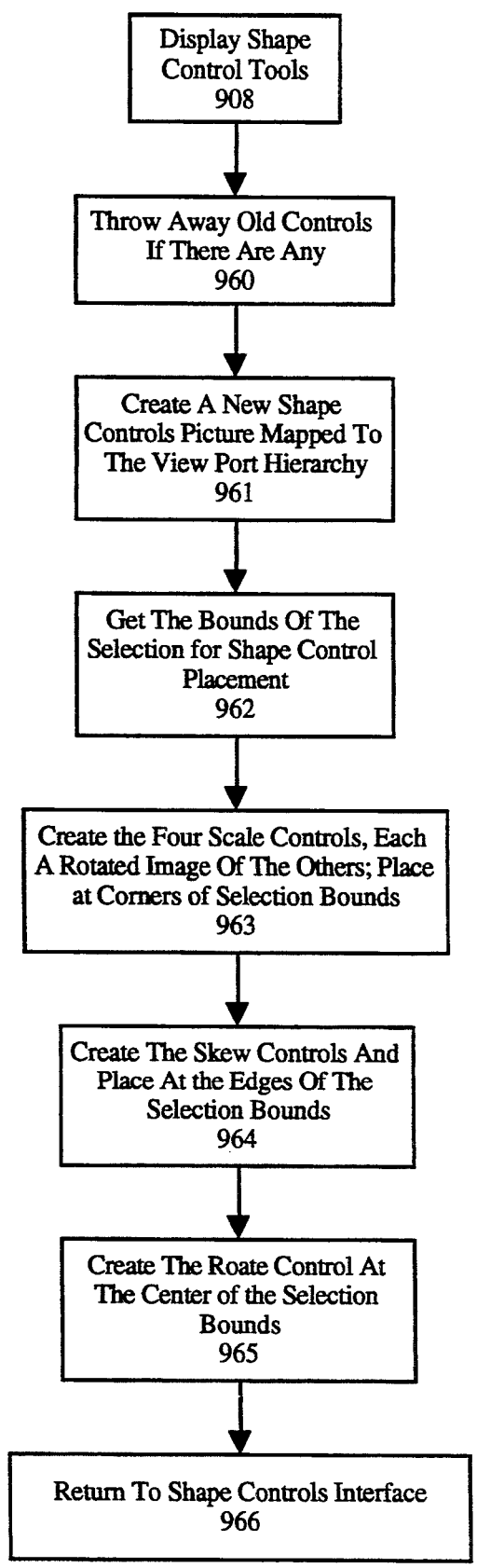
FIG. 15 illustrates a more detailed flow chart for displaying the shape control tools of the present invention.

FIG. 15 illustrates the steps for the routine Display Shape Control Tools 908. First, at step 916 any old controls that are displayed are thrown away. Then, at step 961 a new shape controls picture is created and mapped through the viewport hierarchy being maintained by the graphics system. At step 962, the routine determines the bounds of the selection so that it is known where to place the shape controls. Step 963 creates the four scale controls, each of which is a rotated image of the other. The scale controls are then placed at the corners of the selection bounds. Obviously, placement of the scale controls is arbitrary but in the preferred embodiment of the present invention they are placed at the corners of the selection.

At box 964, the skew controls are placed at the edges of the selection bounds. Then at step 965 the rotate control is displayed, initially being at the center of the selection bounds. As has been discussed above, the shape controls themselves are graphical objects, so their placement and orientation is controlled by passing the information to the underlying graphics system. Finally, at step 966 the routine returns to the shape controls user interface.

Although the present invention has been described in terms of a particular embodiments, it will be appreciated that various modifications and alterations might be made by those skilled in the art without departing from the spirit and scope of the present invention. The invention should, therefore, be measured in terms of the claims which follow.

What is claimed is:

1. In a computer system utilizing a graphics subsystem and having a cursor positioning device which comprises a switch having at least first and second positions, a method of manipulating graphical objects in a non-modal fashion on a computer display in an interactive computer graphics environment comprising the steps of:

monitoring for a graphical object to be selected, said graphical object comprising at least one or more shapes;

displaying non-modal object control tools in the proximity of a graphical object that has been selected, said non-modal object control tools including non-modal skew control tools;

detecting when one of the displayed non-modal object control tools is selected;

monitoring the movement of the cursor positioning device relative to the initial position of a selected non-modal object control tool; and manipulating the selected graphical object as determined by which non-modal object control tool is selected and the subsequent movement of the cursor.

2. The method as described in claim 1 further comprising, after said detecting step, the step of erasing the non-modal object control tools that are not selected.

3. The method as described in claim 2 wherein said step of displaying non-modal object control tools comprises the steps of:

determining the bounds of the selected graphical object;

displaying non-modal scale control tools around said selected graphical object; and displaying a non-modal rotate control tool at a predetermined point with respect to said selected graphical object.

4. The method as described in claim 3 wherein said step of displaying non-modal scale control tools comprises the steps of:
creating four non-modal scale control tools, each a rotated image of the other; and
placing the four non-modal scale control tools at opposing positions defined by the bounds of the selected graphical object.

5. The method as described in claim 1 wherein said step of displaying non-modal skew control tools comprises the steps of:
creating the non-modal skew control tools; and
placing the non-modal skew control tools at opposing positions defined by the bounds of the selected graphical object.

6. The method as described in claim 3 wherein said step of displaying a non-modal rotate control tool comprises the step of displaying the non-modal rotate control tool at the center of the bounds of the selected graphical object.

7. The method as described in claim 3 wherein said manipulating step comprises the step of moving the selected graphical object from a first location to a second location when said switch of said cursor positioning device is in said second position.

8. The method as described in claim 7 wherein said moving step comprises the steps of:
following said cursor positioning device while said switch of said cursor positioning device is in said second position;
supplying moving information to said graphic subsystem identifying said selected graphical object and the new location of said cursor positioning device; and
redisplaying the non-modal object control tools in the proximity of the selected graphical object at said second location when said switch of said cursor positioning device is returned to said first position.

9. The method as described in claim 3 wherein said manipulating step comprises the step of scaling the selected graphical object from a first size to a second size when said selected non-modal object control tool is one of said non-modal scale control tools.

10. The method as described in claim 9 wherein said scaling step comprises:
following said cursor positioning device while said non-modal scale control tool is selected;
supplying scaling information to said graphics subsystem identifying said selected graphical object and the new location of said cursor positioning device; and
displaying the scaled graphical object after scaling has been applied.

11. The method as described in claim 3 wherein said manipulating step comprises the step of skewing the selected graphical object from a first skew orientation to a second skew orientation when said selected non-modal object control tool is one of said non-modal skew control tools.

12. The method as described in claim 11 wherein said skewing step comprises:
following said cursor positioning device while said non-modal skew control tool is selected;
supplying skewing information to said graphics subsystem identifying said selected graphical object and the new location of said cursor positioning device; and
displaying the skewed graphical object after skewing has been applied.

13. The method as described in claim 3 wherein said manipulating step comprises the step of rotating the selected graphical object from a first rotational orientation to a second rotational orientation when said selected non-modal object control tool is the non-modal rotate control tool.

14. The method as described in claim 13 wherein said rotate step comprises:
following said cursor positioning device while said non-modal rotate control tool is selected;
supplying rotation information to said graphics subsystem identifying said selected graphical object and the new location of said cursor positioning device; and
displaying the rotated graphical object after rotating has been applied.

15. The method as described in claim 3 wherein said manipulating step comprises the step of moving the non-modal rotate control tool from a first location with respect to the selected graphical object to a second location with respect to the selected graphical object.

16. The method as described in claim 1 wherein said step of monitoring for a graphical object to be selected comprises the steps of:
determining when said cursor positioning device indicates a position which intersects a graphical object; and
detecting when said switch of said cursor positioning device is placed temporarily into said second position and then returned to said first position.

17. The method as described in claim 1 wherein said step of monitoring for a graphical object to be selected comprises the steps of:
detecting when said cursor positioning device indicates a point not intersecting a graphical object, defining a first corner of a selection rectangle;
detecting when said switch of said cursor positioning device is placed in said second position;
following the motion of said cursor positioning device;
detecting when said switch of said cursor positioning device is returned to said first position, defining a diagonally opposing corner of said selection rectangle;
selecting all objects which intersect the selection rectangle defined by said first and diagonally opposing corners of said selection rectangle; and
compositing all selected objects into a single selected graphical object.

18. In a computer system, said computer system including a processor, bus, cursor positioning circuitry, RAM memory and disk memory, a computer controlled graphics display system for providing an interface with a user of said computer system, said computer controlled graphics display system comprising:
circuitry for displaying graphical objects;
circuitry for selecting a graphical object coupled to said circuitry for displaying graphical objects, said graphical object comprising one or more shapes;
circuitry for displaying non-modal object control tools in the proximity of said graphical object, said non-modal object control tools including non-modal skew object control tools;

circuitry for selecting at least one of said non-modal object control tools; and circuitry for manipulating a selected graphical object responsive to the motion of said cursor positioning circuit with respect to a selected non-modal object control tool.

19. The computer controlled graphics display system of claim 18 wherein said non-modal graphics control tools comprise non-modal scale control tools, non-modal skew control tools and a non-modal rotate control tool.

20. In a computer system utilizing a graphics subsystem and having a cursor positioning device which comprises a switch having at least first and second positions, a method of manipulating graphical objects in a non-modal fashion on a computer display in an interactive computer graphics environment comprising the steps of:

monitoring for a graphical object to be selected, said graphical object comprising at least one or more shapes;

displaying non-modal object control tools in the proximity of a graphical object that has been selected, said non-modal object control tools including a non-modal rotate control tool;

detecting when one of the displayed non-modal object control tools is selected;

monitoring the movement of the cursor positioning device relative to the initial position of a selected non-modal object control tool; and manipulating the selected graphical object as determined by which non-modal object control tool is selected and the subsequent movement of the cursor.

21. The method as described in claim 1 wherein said step of monitoring for a graphical object to be selected comprises the steps of:

determining when said cursor positioning device indicates a position which simultaneously intersects first and second graphical objects, wherein said first graphical object overlaps said second graphical object;

detecting the selection of said first graphical object when said switch of said cursor positioning device is twice placed temporarily into said second position and returned to said first position; and after said first graphical object has been selected, detecting the selection of said second graphical object when said switch of said cursor positioning device is twice placed temporarily into said second position and returned to said first position.

* * * * *